US007227762B1

(12) United States Patent
Cheung

(10) Patent No.: US 7,227,762 B1
(45) Date of Patent: Jun. 5, 2007

(54) FINE-TUNING CIRCUIT FOR THE WINDING VOLTAGE OF A TRANSFORMER

(75) Inventor: Chi Hung Cheung, Hong Kong (HK)

(73) Assignee: PI International Ltd., Tortola (VG)

( * ) Notice: Subject to any disclaimer, the term of this patent is extended or adjusted under 35 U.S.C. 154(b) by 0 days.

(21) Appl. No.: 11/433,442

(22) Filed: May 15, 2006

(51) Int. Cl.
*H02M 3/335* (2006.01)
*H02M 7/44* (2006.01)

(52) U.S. Cl. .............................. 363/21.12; 363/56.01; 363/97

(58) Field of Classification Search ............ 363/21.12, 363/21.16, 21.17, 56.01, 97, 131
See application file for complete search history.

(56) References Cited

U.S. PATENT DOCUMENTS 5,898,581 A * 4/1999 Liu ............................ 363/53
5,917,715 A * 6/1999 Lee ......................... 363/21.04
5,936,853 A * 8/1999 Mweene ...................... 363/44
5,978,238 A * 11/1999 Liu ......................... 363/56.09
6,005,782 A * 12/1999 Jain et al. ................ 363/21.12
6,348,848 B1 2/2002 Herbert
6,466,462 B2 * 10/2002 Nishiyama et al. ...... 363/21.11
6,735,094 B2 5/2004 Steigerwald et al.
6,992,902 B2 * 1/2006 Jang et al. .................... 363/17

* cited by examiner

*Primary Examiner*—Bao Q. Vu
(74) *Attorney, Agent, or Firm*—Rosenberg, Klein & Lee

(57) ABSTRACT

A fine-turning circuit is used for adjusting the output voltage of a main transformer in an electrical power convert device and solving the problem of turns granularity of conventional transformers. The fine-turning circuit includes an auxiliary transformer having a primary coil and a secondary coil, and a voltage level clamper connected with the secondary coil of the auxiliary transformer via a diode. The primary coil of the auxiliary transformer is connected with the renovated winding in serial. When a current flows through the renovated winding, the secondary coil of the auxiliary transformer reacts to an amended voltage so as to amend the output voltage of the main transformer. The amended voltage is adjusted via changing the turn ratio of the primary coil to the secondary coil of the auxiliary transformer.

4 Claims, 7 Drawing Sheets

FINE-TUNING CIRCUIT FOR THE WINDING VOLTAGE OF A TRANSFORMER

BACKGROUND OF THE INVENTION

1. Field of the Invention

The present invention relates to a fine-tuning circuit for the winding voltage of a transformer. In particular, this invention relates to a fine-tuning circuit that is used for adjusting the output voltage of a main transformer in a power switching and conversion device.

2. Description of the Related Art

Transformers comprise a primary coil and at least one secondary coil, and are used for converting electrical power. Generally, the primary coil of a transformer is connected with a primary circuit and the secondary coil is connected with a secondary circuit. Electrical power from the primary circuit is transmitted to the primary coil of the transformer. Then, the transformer converts the electrical power into magnetic force, and the magnetic force is transmitted to the primary side of the transformer via the iron core of the transformer and is converted into electrical power and outputted via the secondary coil of the transformer. The electrical power on the secondary coil, such as the current or voltage, is related to the number of turns of the coil. The desired voltage or current is outputted from the secondary coil by adjusting the number of turns of the primary coil and the secondary coil of the transformer. Therefore, a variety of output voltages are available by adjusting the number of turns of the primary coil and a plurality of secondary coils of the transformer.

Nowadays, electronic circuits usually require a high power rate and a low voltage output. The secondary coil of the transformer cannot have too many turns, because of the problem of turns granularity. An engineer usually adjusts the number of turns of the coil to change the output voltage. However, this method cannot fully provide the desired voltage. For example, when a circuit needs to be 8V and 5V, 5V can be outputted if the number of the turns of the secondary coil of the transformer is 2. Under this condition, 7.5V is outputted when the number of the turns of the secondary coil of the transformer is 3 or 10V is outputted when the number of the turns of the secondary coil of the transformer is 4. The output voltage does not equal 8V. Therefore, the engineer needs to use a secondary coil with 3.2 turns to output the desired 8V. It can be implemented in a transitional transformer and a special transformer is needed. However, the special transformer has drawbacks, such as it is large in size, expensive, and needs special electric-magnetic components that are not easily obtained, etc.

Reference is made to FIG. 4, which is a schematic diagram of U.S. Pat. No. 6,348,848 that discloses a structure of a transformer having fractional-turn winding. An alternative solution for this problem is a coil with an exact number of turns (meaning, for example, 2, 3 or 4 turns, as opposed to 2.1, 3.3 or 4.7 turns) adopted and a resistor element, such as a linear constant voltage regulator, or voltage-time eating means, such as a saturable reactor, adopted to lower the voltage. However, both the resistor element and the voltage-time eating means suffer heat problems and lose power in the process. FIG. 5 is a circuit diagram of the power supply disclosed in U.S. Pat. No. 6,735,094. The power supply uses the saturable reactors Lsat3 and Lsat4 to lower the output voltages of secondary coils N3 and N4 of the transformers 1 and 2.

FIG. 6A is a circuit diagram of a linear constant voltage regulator that has the same effect as the resistor.

FIG. 6B is a circuit diagram of a switching constant voltage regulator that has the same effect as the resistor. The switching constant voltage regulator amends the output voltage and reduces power loss. Because the switching constant voltage regulator is expensive, large and complex it is not extensively used in electronic circuits.

FIG. 7 is a circuit diagram of a converter having multiple outputs. A circuit of the converter having multiple outputs was disclosed on Feb. 1, 2001 in EDN by Robert Bell. Robert Bell utilized a differential transformer to solve the problem of turns granularity of conventional transformers. The differential transformer T2 is an auxiliary transformer having a primary coil 23T and a secondary coil 10T. The primary coil 23T of the differential transformer T2 couples to the secondary coil 1T of the main transformer T1 in parallel. The secondary coil 10T of the differential transformer T2 couples to another secondary coil 1T of the main transformer T1 in serial. The secondary coil 10T of the differential transformer T2 is used for amending the output voltage of another secondary coil 1T of the main transformer T1.

However, the differential transformer T2 still has a problem. Although the primary coil 23T of the differential transformer T2 does not carry the output current, the primary coil 23T can have more turns. However, the secondary coil 10T cannot have more turns because the output current is already loaded on it. Therefore, the amended voltage is limited and the problem of turns granularity cannot be fully solved.

The differential transformer has another problem. The drop in voltage caused by a DC current flowing through the secondary coil 1T of the main transformer T1 makes the voltage-time product between the ends of the coil not equal zero. Because the primary coil 23T of the differential transformer T2 couples to the secondary coil 1T of the main transformer T1 in parallel, the non-zero voltage-time product nearly saturates the magnetic core of the differential transformer. In order to prevent saturation from occurring, the differential transformer T2 must have a larger resistor and a magnetic core of the primary coil 23T so that the volume of the differential transformer T2 is large.

SUMMARY OF THE INVENTION

One particular aspect of the present invention is to provide a method for adjusting the output voltage of a main transformer in an electrical power convert device. The present invention improves upon the problem of turns granularity of the conventional transformer and provides a fine-tuning circuit that is simple and has high efficiency to dynamically amend the output voltage of the main transformer.

The present invention includes an auxiliary transformer. When the auxiliary transformer operates during the power transmitting cycle, its action is similar to the differential transformer. However, this auxiliary transformer does not suffer the problem of saturation. Because the auxiliary transformer is removed from the main transformer when the main transformer is operating in idle, the magnetic flux of the auxiliary transformer is automatically reset.

In another embodiment, the present invention uses a voltage clamper connected with the secondary coil of the auxiliary transformer to adjust the output voltage of the main transformer.

In one further embodiment, the voltage clamper is replaced by a linear constant voltage regulator. The circuit of the linear constant voltage regulator is simple and is composed of commonly available components. The power needed for this circuit is low because the surplus voltage of the main transformer winding can be converted into voltage of a proper quantity and forward transmitted to the output circuit.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1A:
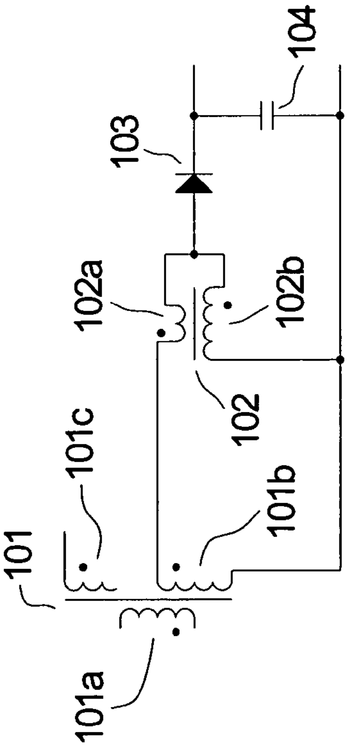
FIG. 1A is a circuit diagram of the first embodiment of the present invention.

Reference is made to FIG. 1A, which shows a circuit diagram of the first embodiment of the present invention. The main transformer 101 has a primary coil 101_a_, a secondary coil 101_b_, and another secondary coil 101_c_. The secondary coil 101_b_ is a subject secondary winding and has the problem of turns granularity. An auxiliary transformer 102 has a primary coil 102_a_, and a secondary coil 102_b_. The primary coil 102_a_ of the auxiliary transformer 102 is connected with the renovated winding 101_b_ of the main transformer 101 in series. The primary coil 102_a_ of the auxiliary transformer 102 is connected with the secondary coil 102_b_ in serial to form a secondary coil of a differential transformer straddling over the subject secondary winding 101_b_. An amended voltage that is equivalent to the end voltage of the renovated winding 101_b_ reacts to the two ends of the primary coil 102_a_. A diode 103 is connected with the subject secondary winding 101_b_ via the primary coil 102_a_. The output voltage of the subject secondary winding 101_b_ is adjusted via the amended voltage of the two ends of the primary coil 102_a_, and is transmitted to an output filtering capacitor 104 via the diode 103. The surplus voltage on the subject secondary winding 101_b_ caused by the turns granularity is cancelled by the amended voltage of the two ends of the primary coil 102_a_. The problem of turns granularity is solved.

Figure 1B:
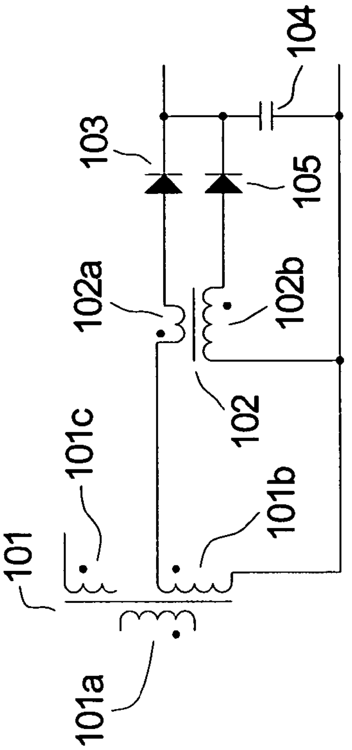
FIG. 1B is a circuit diagram of the second embodiment of the present invention.

Reference is made to FIG. 1B, which shows a circuit diagram of the second embodiment of the present invention. The main transformer 101 and the auxiliary transformer 102 are the same as those in FIG. 1A. The primary coil 102_a_ of the auxiliary transformer 102 is not connected with the secondary coil 102_b_ in serial. The secondary coil 102_b_ of the auxiliary transformer 102 is connected in serial with a level-clamping diode 105. The secondary coil 102_b_ straddles over the output filtering capacitor 104 via the level-clamping diode 105. The output voltage of the subject secondary winding 101_b_ is transmitted to the output filtering capacitor 104 via the primary coil 102_a_ and the diode 103. When output current flows through the primary coil 102_a_ of the auxiliary transformer 102, a voltage is reacted on the secondary coil 102_b_ of the auxiliary transformer 102 so as to output a secondary current. The secondary current flows into the output filtering capacitor 104 via the level-clamping diode 105. The cathode of the diode 103 is connected with the cathode of the level-clamping diode 105 and both have a forward bias. Therefore, the voltage on the anode of both diodes is also similar.

The operation of this embodiment is the same as that of FIG. 1A, in which the anodes are connected together. The amended voltage at the two ends of the primary coil 102_a_ can be adjusted by changing the number of turns of the coil of the auxiliary transformer 102, as with the differential transformer. However, the difference between this embodiment and the differential transformer is that when the output current flowing through diode 103 stops, the level-clamping diode 105 also cuts off. At this time, the auxiliary transformer 102 escapes from the loading circuit. When the auxiliary transformer 102 escapes from the loading circuit, the voltage on the coil flies back freely and the magnetic flux of the iron core is also released.

Figure 1C:
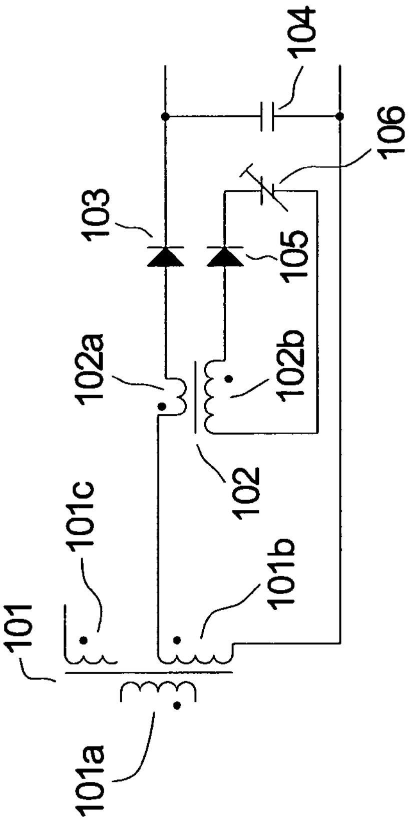
FIG. 1C is a circuit diagram of the third embodiment of the present invention.

Reference is made to FIG. 1C, which shows a circuit diagram of the third embodiment of the present invention. FIG. 1C is similar to FIG. 1B. The difference is that the secondary coil 102_b_ of the auxiliary transformer 102 is connected with a fixed voltage 6, not an output filtering capacitor 104. When output current flows through the primary coil 102_a_ of the auxiliary transformer 102, a voltage reacts on the secondary coil 102_b_ of the auxiliary transformer 102. The voltage is limited by the fixed voltage 6 via the level-clamping diode 105. The voltage value is the sum of the drop in voltage of the level-clamping diode 105 and the fixed voltage 6. The voltage reacts to the primary coil 102_a_ of the auxiliary transformer 102 according to the turn ratio of the coils of the primary coil 102_a_ of the auxiliary transformer 102. Via this connection relationship, the output voltage of the subject secondary winding 101_b_ is adjusted by changing the voltage on the primary coil 102_a_ of the auxiliary transformer 102. The voltage on the primary coil 102_a_ of the auxiliary transformer 102 is determined by the drop in voltage of the level-clamping diode 105, the voltage value of the fixed voltage 6, and the turn ratio of the coils of the auxiliary transformer 102. Thereby, the present invention changes the turns ratio of the coils of the auxiliary transformer 102 to amend the output voltage on the subject secondary winding 101*b* so as to provide the desired voltage. Alternatively, the present invention also can dynamically change the voltage value of the fixed voltage 6 to achieve the same effect.

Figure 1D:
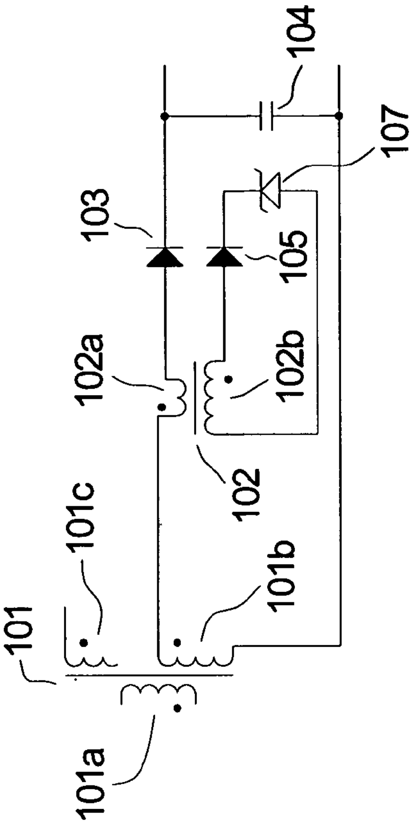
FIG. 1D is a circuit diagram of the fourth embodiment of the present invention.

Reference is made to FIG. 1D, which shows a circuit diagram of the fourth embodiment of the present invention. FIG. 1D is similar to FIG. 1C. The difference is that a Zener diode 107 replaces the fixed voltage 6. The operating method and principle of this embodiment is the same as FIG. 1C.

Figure 2A:
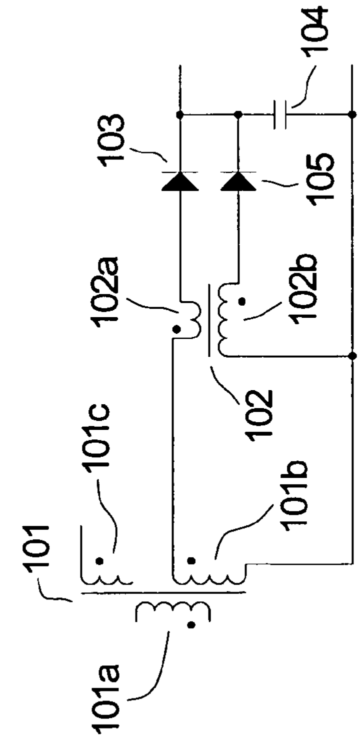
FIG. 2A is the same as FIG. 1B.

Reference is made to FIG. 2A, which is the same as FIG. 1B. The voltage on the output filtering capacitor 104 is supplied by the output voltage of the subject secondary winding 101*b*, and the output filtering capacitor 104 is used as a voltage clamper. The secondary coil 102*b* of the auxiliary transformer 102 is connected with the level-clamping diode 105 in serial, and both the secondary coil 102*b* and the level-clamping diode 105 are straddled over and connected with the output filtering capacitor 104. The secondary coil 102*b* of the auxiliary transformer 102 obtains the output voltage of the output filtering capacitor 104 via the level-clamping diode 105 and reacts with the obtained voltage to the primary coil 102*a* of the auxiliary transformer 102. The voltage on the primary coil 102*a* of the auxiliary transformer 102 is used to reduce the surplus output voltage on the subject secondary winding 101*b*.

Figure 2B:
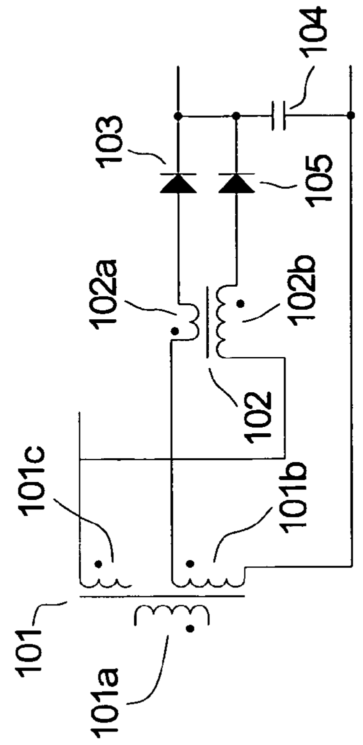
FIG. 2B is a circuit diagram of the fifth embodiment of the present invention.

Reference is made to FIG. 2B, which shows a circuit diagram of the fifth embodiment of the present invention. One end of the secondary coil 102*b* of the auxiliary transformer 102 is connected with the level-clamping diode 105 in serial, and is then connected to the output filtering capacitor 104. Another end of the secondary coil 102*b* of the auxiliary transformer 102 is connected with another secondary coil 101*c* of the main transformer 101. Therefore, the secondary coil 102*b* of the auxiliary transformer 102 is clamped to a voltage. The voltage is the voltage value of the output filtering capacitor 10 subtracted from the voltage value on another secondary coil 101*c* (the drop in voltage on the level-clamping diode 105 can usually be ignored). This embodiment solves the problem of turns granularity of the main transformer 101 and transfers the demanded loading current to improve the voltage cross-regulation when another secondary coil 101*c* of the main transformer 101 requires additional loading to balance the loads between the outputs.

Figure 2C:
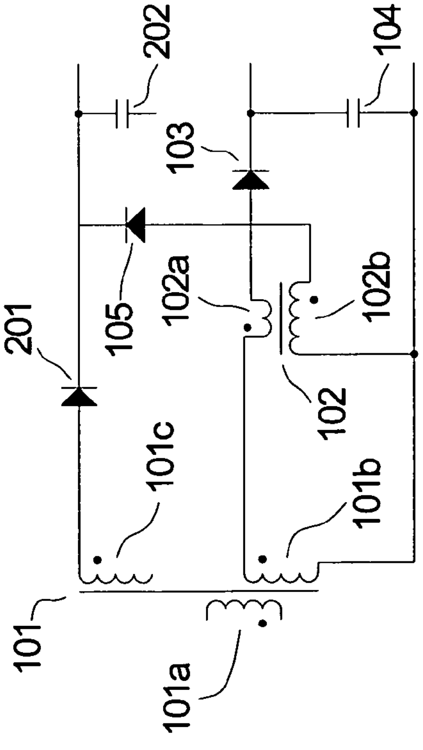
FIG. 2C is a circuit diagram of the sixth embodiment of the present invention.

Reference is made to FIG. 2C, which shows a circuit diagram of the sixth embodiment of the present invention. A rectifier rectifies the AC voltage on another secondary coil 101*c* of the main transformer 101 into DC voltage. The DC voltage is outputted to a secondary circuit. The secondary circuit is connected with a second output filtering capacitor 202, and the second output filtering capacitor 202 is used as a voltage clamper. The secondary coil 102*b* of the auxiliary transformer 102 is connected with the level-clamping diode 105 in serial, and the secondary coil 102*b* and the level-clamping diode 105 are straddled over the second output filtering capacitor 202. The voltage on the secondary coil 102*b* of the auxiliary transformer 102 is obtained from the voltage of the second output filtering capacitor 202 via the level-clamping diode 105. Therefore, this embodiment solves the problem of turns granularity of the main transformer 101 and transfers the demanded loading current to improve the voltage cross-regulation when the secondary circuit requires additional electrical power to balance the loads between the outputs.

Figure 2D:
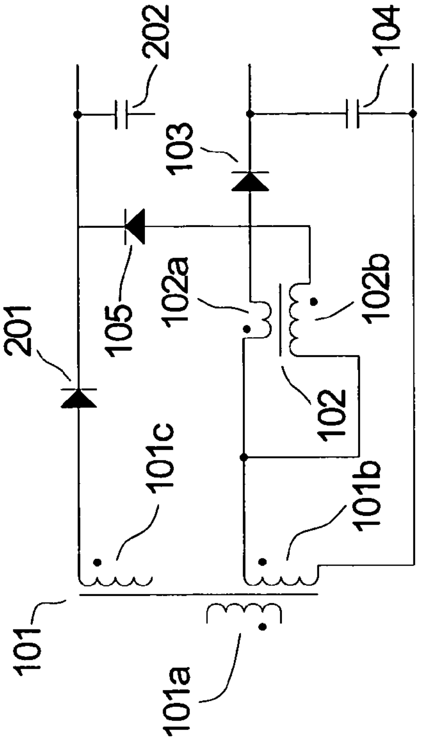
FIG. 2D is a circuit diagram of the seventh embodiment of the present invention.

Reference is made to FIG. 2D, which shows a circuit diagram of the seventh embodiment of the present invention. The secondary coil 102*b* of the auxiliary transformer 102 is connected with the level-clamping diode 105 in serial, and the secondary coil 102*b* and the level-clamping diode 105 are straddled over the subject secondary winding 101*b* of the main transformer 101 and the second output filtering capacitor 202. Therefore, the secondary coil 102*b* of the auxiliary transformer 102 is clamped to a voltage. The voltage is the voltage value of the value subtracted from the voltage value on the subject secondary winding 101*b* of the main transformer 101 (the drop in voltage on the level-clamping diode 105 can usually be ignored). Therefore, this embodiment solves the problem of turns granularity of the main transformer 101 and transfers the demanded loading current to improve the voltage cross-regulation when the renovated winding 101*b* of the main transformer 101 requires additional electrical power to balance the loads between the outputs.

Figure 3A:
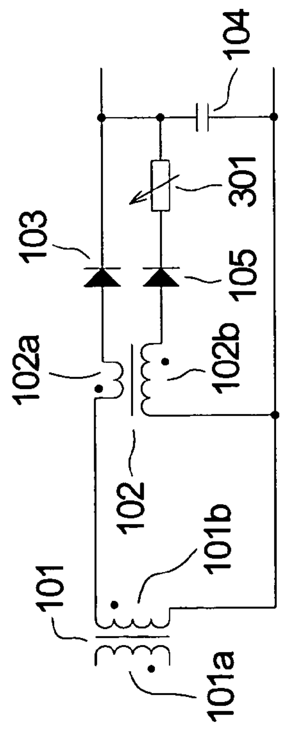
FIG. 3A is a circuit diagram of the eighth embodiment of the present invention.

Reference is made to FIG. 3A, which shows a circuit diagram of the eighth embodiment of the present invention. A resistor 310 is connected with the secondary coil 102*b* of the auxiliary transformer 102 and the level-clamping diode 105, and the resistor 310, the secondary coil 102*b*, and the level-clamping diode 105 are straddled over the output filtering capacitor 104. When current flows through the resistor 301, there is a voltage difference on the resistor 301. The voltage difference on the resistor 301 increases the voltage on the secondary coil 102*b* and reacts to the primary coil 102*a*. The voltage on the primary coil 102*a* cancels the reaction voltage on the subject secondary winding 101*b* of the main transformer 101 so as to lower the voltage on the output filtering capacitor 104. Therefore, the present invention changes the resistance of the resistor 301 to adjust the output voltage.

The resistor 301 can be a variable resistor. The resistance of the resistor 301 is changed according to the magnitude of the DC voltage on the output filtering capacitor 104. When the DC voltage becomes higher, the resistance of the resistor 301 also becomes higher. When the DC voltage becomes lower, the resistance of the resistor 301 also becomes lower. Alternatively, the resistor 301 can be a control circuit that is included in a control system. The control circuit changes the resistance of the resistor 301 according to the magnitude of the output voltage so as to control the voltage clamping level of the secondary coil of the auxiliary transformer. Therefore, the output voltage is automatically adjusted.

Figure 3B:
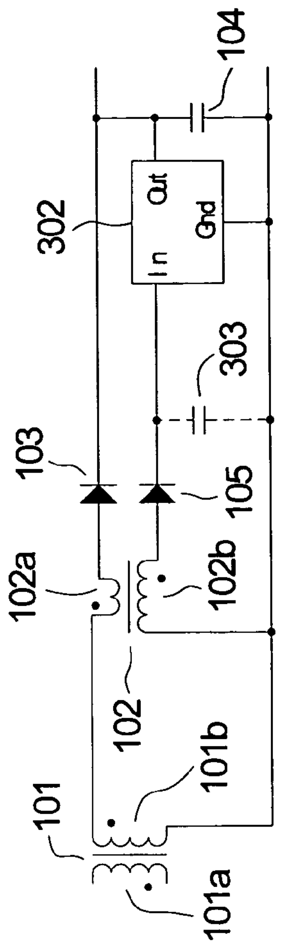
FIG. 3B is a circuit diagram of the ninth embodiment of the present invention.

Reference is made to FIG. 3B, which shows a circuit diagram of the ninth embodiment of the present invention. A linear constant voltage circuit 302 is used to replace the resistor 301 in the eighth embodiment (as shown in FIG. 3A). The linear constant voltage circuit 302 includes an output terminal, an input terminal, and a grounding terminal. The input terminal of the linear constant voltage circuit 302 is connected with the secondary coil 102*b* of the auxiliary transformer 102 and the level-clamping diode 105 in serial. A filtering capacitor 303 is straddled over and connected with the input terminal. The filtering capacitor 303 is not a necessary component (represented by a dash line). It usually cooperates with a general linear constant voltage regulator IC, such as 78xx IC series. The output terminal of the linear constant voltage circuit 302 is connected with the output filtering capacitor 104. The grounding terminal of the linear constant voltage circuit 302 is connected with a reference voltage. Therefore, the linear constant voltage circuit 302 can detect the output voltage. When the output voltage is lower than a target voltage, the linear constant voltage circuit 302 conducts the current outputted from the secondary coil 102*a* to the output filtering capacitor 104. At this moment, the operating principle of the linear constant voltage circuit 302 is the same as the resistor 301 operating under a low resistance. Then the voltage on the primary coil 102*a* and the secondary coil 102*b* of the auxiliary transformer 102 also decreases. Thereby, the renovation acting on the reacting voltage of the subject secondary winding 101*b* of the primary transformer 101 becomes less and the voltage on the output filtering voltage 104 increases.

Alternatively, when the output voltage detected by the linear constant voltage circuit 302 is higher than the target voltage, the linear constant voltage circuit 302 stops outputting the current from the secondary coil 102*b* to output filtering capacitor 104. At this moment, the operating principle of the linear constant voltage circuit 302 is the same as the resistor 301 operating under a high resistance. The voltage on the primary coil 102*a* and the secondary coil 102*b* of the auxiliary transformer 102 is then increased. Thereby, the renovation acting on the reacting voltage of the subject secondary winding 101*b* of the primary transformer 101 becomes stronger and the voltage on the output filtering voltage 104 decreases. The output voltage on the output filtering capacitor 104 can be adjusted by setting the target voltage in the linear constant voltage circuit 302.

Figure 6A:
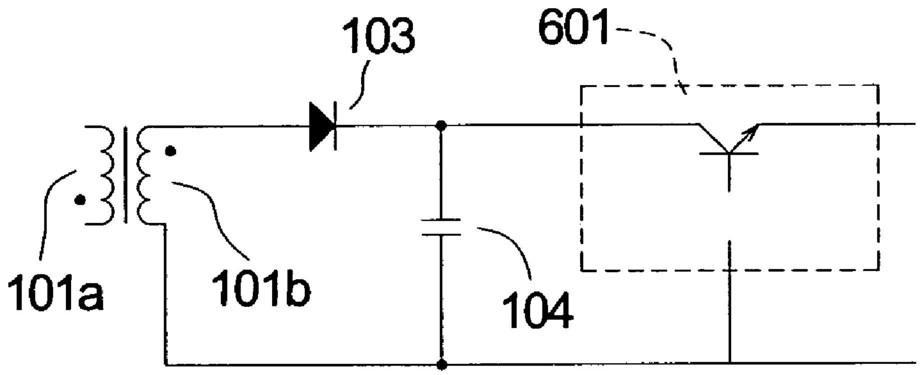
FIG 6A PRIOR ART
FIG. 6A is a circuit diagram of a linear constant voltage regulator.
Figure 6B:
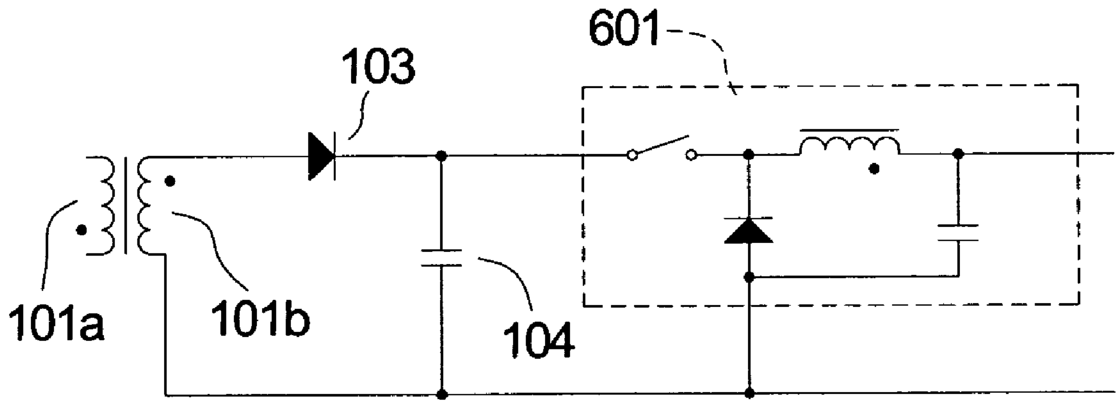
FIG 6B PRIOR ART
FIG. 6B is a circuit diagram of a switching constant voltage regulator.
Figure 7:
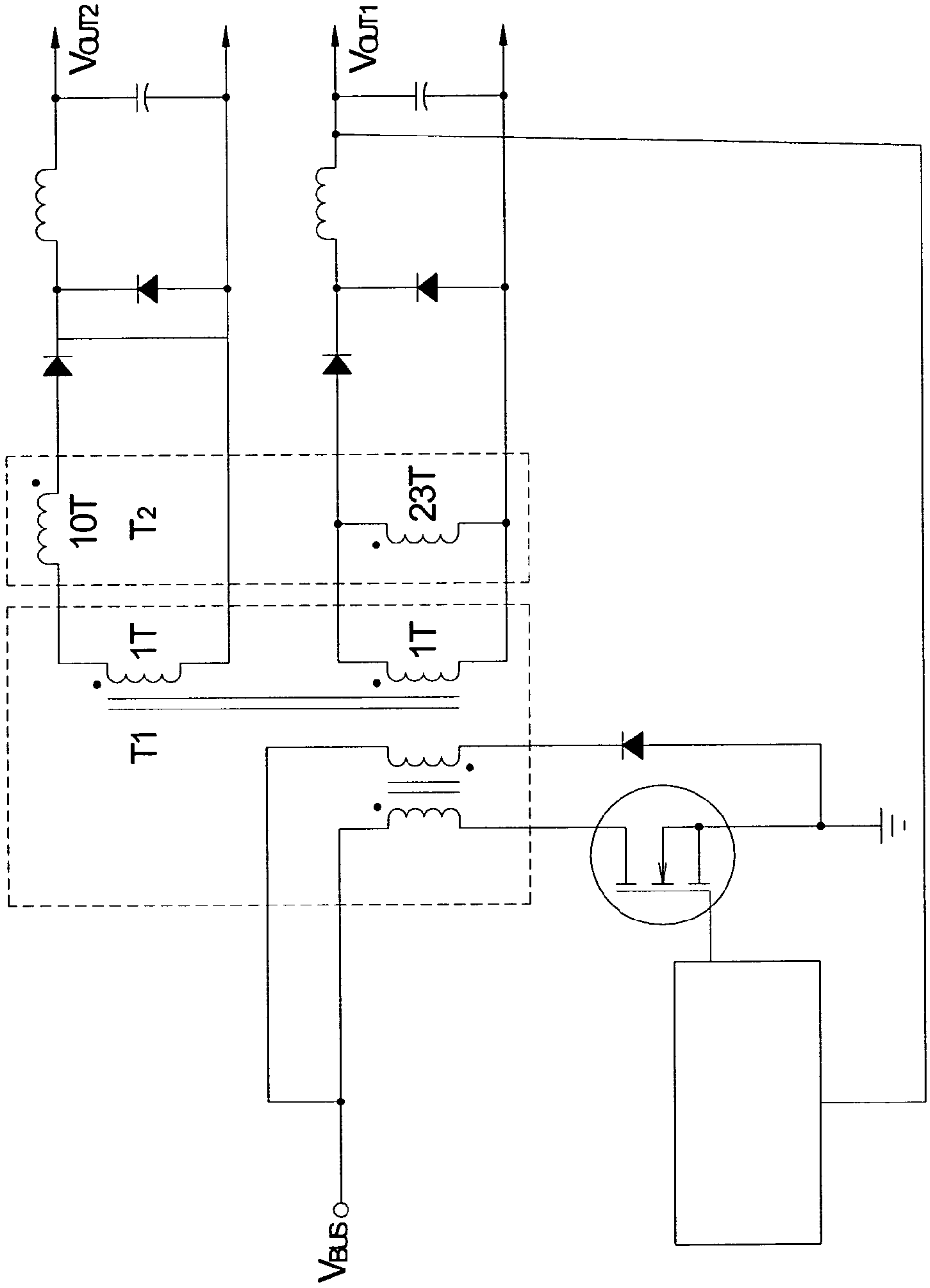
FIG 7 PRIOR ART
FIG. 7 is a circuit diagram of a differential transformer.

In this embodiment, the linear constant voltage circuit 302 merely adjusts the input/output voltage difference and part of the output current. Therefore, the power loss of the linear constant voltage circuit 302 is lower than the conventional linear constant voltage regulator, as shown in FIG. 6A.

Reference is made to FIG. 3B. The merits of the present invention adopting the linear constant voltage circuit 302 is illustrated by the following formulas.

$$V\_102a=V1-V2 \quad (1)$$

In formula (1), V1 is the reacting voltage on the renovated winding 101*b* of the primary transformer 101; V_102*a* is the amended voltage on the primary coil 102*a* of the auxiliary transformer 102; V2 is the desired voltage renovated with the amended voltage via the subject secondary winding 101*b*.

$$V\_102b=K*V\_102a=K*(V1-V2) \quad (2)$$

In formula (2), K is the turn ratio of the auxiliary transformer 102; V_102*b* is the voltage on the secondary coil 102*b* of the auxiliary transformer 102.

$$I\_102b=I\_102a/K \quad (3)$$

In formula (3), I_102*a* and I_102*b* are the current flowing through the primary coil 102*a* and the secondary coil 102*b* of the auxiliary transformer 102.

The power consumed by the linear constant voltage circuit 302 is obtained by formula (4).

$$P\_302=V\_302*I\_302 \quad (4)$$

In formula (4), V_302 is a voltage difference between the input terminal and the output terminal of the linear constant voltage circuit 302; I_302 is a current flowing from the input terminal of the linear constant voltage circuit 302 to the output terminal, the magnitude of the current is the same as the current I_102*b* flowing through the secondary coil 102*b* of the auxiliary transformer 102.

The drop in voltage on the level-clamping diode is ignored and the formula (4) can be modified to formula (5).

$$P\_302=(V\_102b-V2)*I\_102b \quad (5)$$

Combining with formulas (1), (2), and (3), the formula (5) is changed to formula (6).

$$P\_302=(K*(V1-V2)-V2)*(I\_102a/K)=(V1-V2)*I\_102a-V2*I\_102a/K \quad (6)$$

In formula (6), (V1−V2)*I_102*a* is a power loss on a conventional linear constant voltage circuit. V2*I_102*a*/K means less power is needed in this embodiment than the conventional linear constant voltage circuit.

If the turn ratio K of the auxiliary transformer 102 is set to a threshold value, such as 1/(V1/V2−1), the power loss P_302 on the linear constant voltage circuit 302 is zero. This is a condition where no drop in voltage occurs in the linear constant voltage circuit 302. Because there is no drop in voltage in the linear constant voltage circuit 302, the output voltage cannot be dynamically adjusted. Therefore, K has to be higher than the threshold value. The power loss of the linear constant voltage circuit 302 is still lower than the conventional linear constant voltage circuit.

Figure 3C:
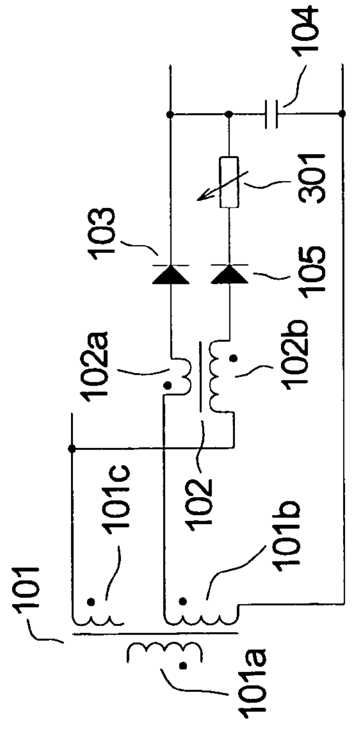
FIG. 3C is a circuit diagram of the tenth embodiment of the present invention.
Figure 3D:
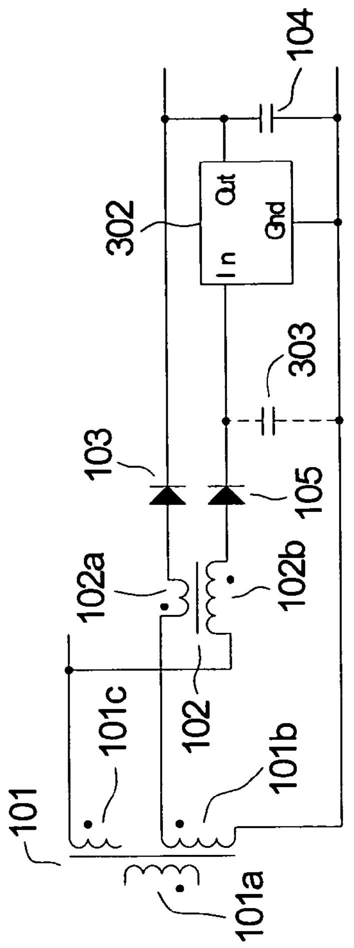
FIG. 3D is a circuit diagram of the eleventh embodiment of the present invention.
Figure 4:
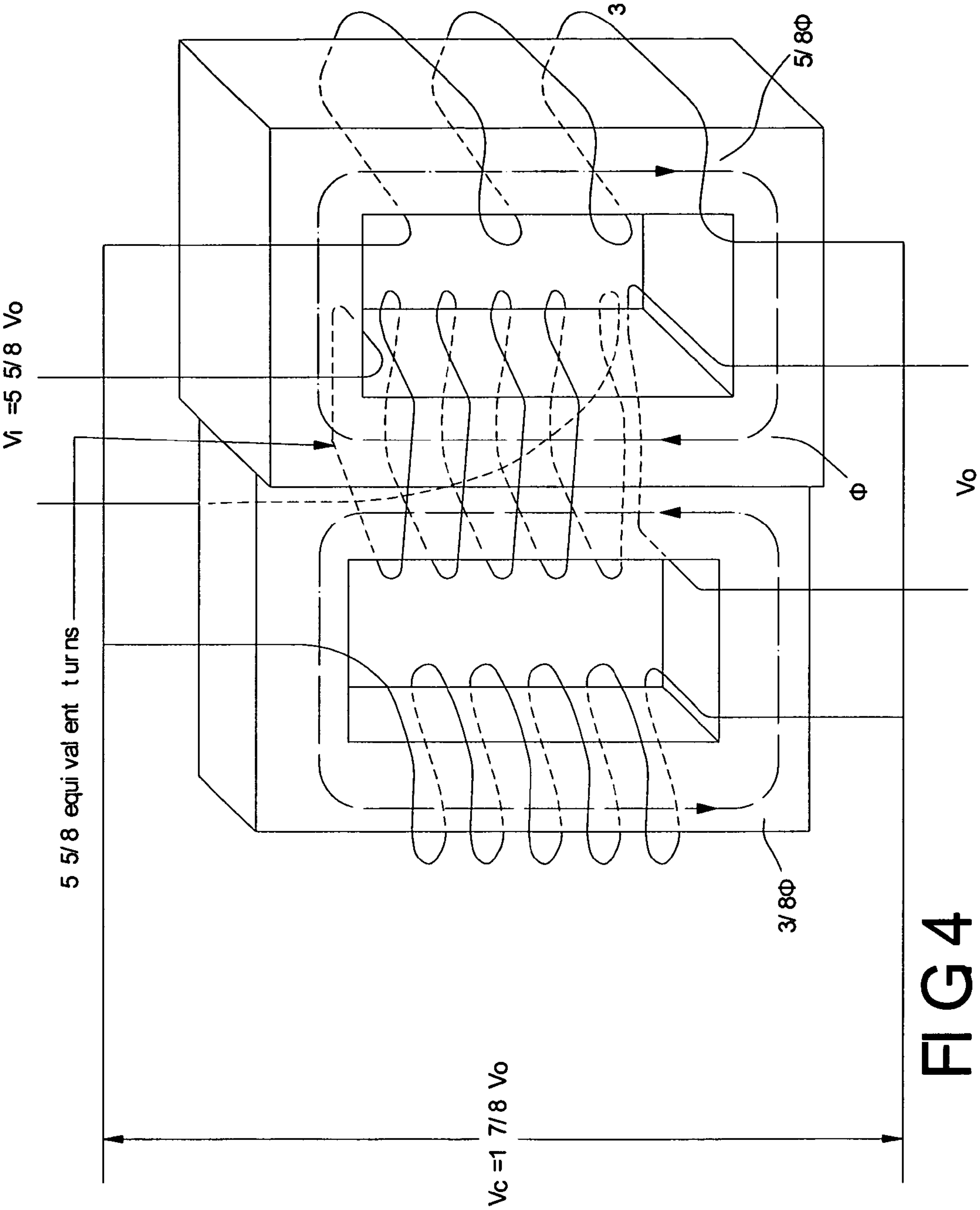
FIG 4 PRIOR ART
FIG. 4 a schematic diagram of a structure of a transformer having the fractional-turn winding disclosed in U.S. Pat. No. 6,348,848.
Figure 5:
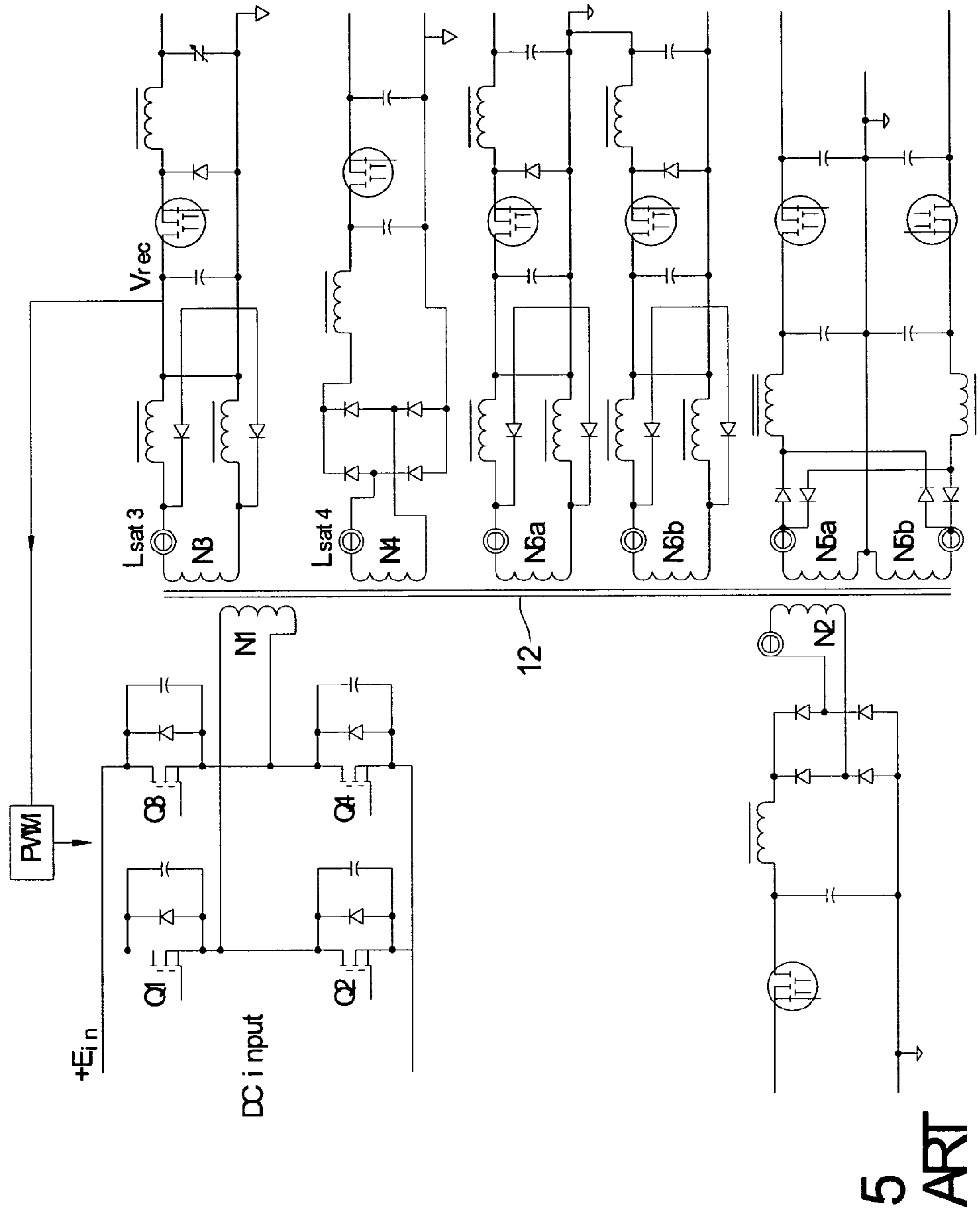
FIG 5 PRIOR ART
FIG. 5 a circuit diagram of a power supply disclosed in U.S. Pat. No. 6,735,094.

Reference is made to FIGS. 3C and 3D, which show circuit diagrams of the tenth and eleventh embodiments of the present invention. In the tenth embodiment, one end of the secondary coil 102*b* of the transformer 102 is connected with the level-clamping diode 105 and the resistor 301 in serial, and is then connected with the output filtering capacitor 104. Another end of the secondary coil 102*b* of the transformer 102 is connected with another secondary coil 101*c* of the main transformer 101. In the eleventh embodiment, the linear constant voltage circuit 302 is used to replace the resistor 301. When the secondary coil 101*c* of the main transformer 101 needs additional loading, these embodiments can transfer the desired loading current from another output set to improve the cross-regulation of the voltage.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A fine-tuning circuit for reducing the induction voltage of a subject secondary winding of a main transformer comprising:

a main transformer having a primary winding, at least one secondary winding including the subject secondary winding;

an auxiliary transformer having a primary coil and a secondary coil, wherein the primary coil of the auxiliary transformer is connected with the subject secondary winding of said main transformer in series, said secondary coil of said auxiliary transformer being coupled to a clamping diode; and a voltage conversion circuit for producing an output voltage having an output capacitor for receiving an output current from said subject secondary winding of said main transformer via an output rectifier diode for each secondary winding;

wherein when the output current flows through said subject secondary winding, an induction voltage is produced across the secondary coil of the auxiliary transformer and the clamping diode couples the induction voltage to the output voltage of said voltage conversion circuit, thereby reducing said induction voltage of said subject secondary winding.

2. A fine-tuning circuit for reducing the induction voltage of a subject secondary winding of a main transformer comprising:

a main transformer having a primary winding, at least one secondary winding including the subject secondary winding;

an auxiliary transformer having a primary coil and a secondary coil, wherein the primary coil of the auxiliary transformer is connected with the subject secondary winding of said main transformer in series, said secondary coil of said auxiliary transformer being coupled to a series combination of a resistor and a clamping diode and a voltage conversion circuit for producing an output voltage having an output capacitor for receiving an output current from said subject secondary winding of said main transformer via an output rectifier diode for each secondary winding;

wherein, when an output current flows through said subject secondary winding, an induction voltage is produced across the secondary coil of the auxiliary transformer, and the series combination of said resistor and said clamping diode couples the induction voltage to said output voltage of said voltage conversion circuit, thereby reducing said induction voltage of said subject secondary winding.

3. The fine-tuning circuit as claimed in claim 2, wherein said resistor is a variable resistor and the resistance of the resistor is changed according to the magnitude of one of the output voltages.

4. The fine-tuning circuit as claimed in claim 3, wherein the variable resistor is implemented in a constant voltage circuit and a change in the resistance of the constant voltage circuit is actuated by a control circuit.

* * * * *